United States Patent Office
3,833,623
Patented Sept. 3, 1974

3,833,623
N-ACYL-O-HYDROCARBYLPHOSPHORO-
AMIDOTHIOATE SALTS
Philip S. Magee, San Rafael, Calif., assignor to Chevron
Research Company, San Francisco, Calif.
No Drawing. Filed Dec. 21, 1972, Ser. No. 317,477
Int. Cl. C08h 3/00, 9/02
U.S. Cl. 260—402.5                    11 Claims

ABSTRACT OF THE DISCLOSURE

S-alkali metal and S-ammonium salts of N-acyl-O-hydrocarbylphosphoroamidothioates are prepared by reacting an N-acyl-O,O-dihydrocarbylphosphoroamidothioate with an alkali metal mercaptide or ammonium mercaptide.

BACKGROUND OF THE INVENTION

U.S. 3,676,555, issued to G. Schrader et al. discloses that compounds having the general formula (I)

wherein R is alkyl are excellent insecticides. These compounds are prepared from S-sodium-O-alkylphosphoroamidothioate by reaction with a methylating agent such as methyl iodide. The sodium salt, in turn, is obtained by the reaction of sodium hydroxide with an O,O-dialkylphosphoroamidothioate as illustrated in the following equation (1):

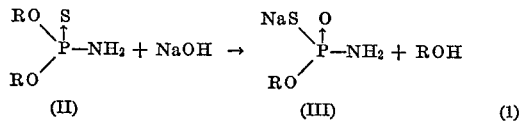

where R is alkyl.

Unfortunately, the insecticides of formula (I) have relatively high mammalian toxicity and are therefore limited in use. U.S. application, Ser. No. 13,846, filed Feb. 24, 1970, now U.S. 3,716,600, discloses that N-acylated derivatives, e.g., N-acetyl, of the compounds of formula (I) are of essentially equal insecticidal activity but are significantly less toxic to mammals. However, it has been found by experimentation that preparation of the new and safer insecticides of U.S. Ser. No. 13,846 from the sodium salt of the corresponding N-acylated phosphoroamidothioate was not possible because the sodium salt would not form upon the reaction of an O,O-dialkyl-N-acylphosphoroamidothioate with sodium hydroxide. Under mild conditions only starting material was recovered; and under more forcing conditions, degradation occurred without the formation of the desired sodium salt.

SUMMARY OF THE INVENTION

It has now been found that an S-alkali metal or ammonium salt is formed from an O,O-dihydrocarbyl-N-acylphosphoroamidothioate by reaction with an alkali metal mercaptide or ammonium mercaptide.

DESCRIPTION OF THE INVENTION

The O,O-Dihydrocarbyl-N-acylphosphoroamidothioate Reactant

The O,O - dihydrocarbyl-N-acylphosphoroamidothioate reactant employed in the process of the invention is represented by the following formula (IV)

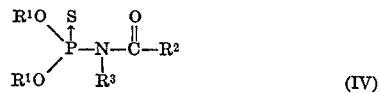

wherein $R^1$ is alkyl, alkenyl or alkynyl of up to 6 carbon atoms, $R^2$ has up to 18 carbon atoms and is hydrogen, alkyl, alkenyl, phenyl, aralkyl or alkaryl substituted with up to 3 fluorine, chlorine or bromine atoms or with up to 1 alkoxy or alkylthio of 1 to 4 carbon atoms, and $R^3$ is hydrogen or alkyl of 1 to 6 carbon atoms.

Representative alkyl groups which $R^1$ and $R^3$ may represent include methyl, ethyl, propyl, isopropyl, butyl, sec-pentyl and hexyl. Representative $R^1$ alkenyl groups of 2 to 6 carbon atoms include vinyl, allyl, 2-butenyl, 3-butenyl, 2-hexenyl, 5-hexenyl, etc. Representative $R^1$ alkynyl groups of 3 to 6 carbon atoms include 2-propynyl, 2-butynyl, 3-butynyl, 3-pentynyl, 5-hexynyl, etc. The $R^1$ groups of formula (IV) may be the same or different. The preferred $R^1$ group is alkyl of 1 to 3 carbon atoms, especially methyl. The preferred $R^3$ group is hydrogen.

Representative alkyl $R^2$ groups are methyl, ethyl, propyl, isopropyl, sec-butyl, pentyl, hexyl, octyl, decyl, dodecyl, tridecyl, pentadecyl, octadecyl, etc. Representative alkenyl $R^2$ groups are allyl, 2-butenyl, 5-hexenyl, 9-decenyl, 14-pentadecenyl, etc. Representative aralkyl $R^2$ groups are benzyl, 2-phenylethyl, 3-(o-tolyl)propyl, 4-phenylhexyl, 6-(o-tolyl)hexyl, etc. Representative alkaryl $R^2$ groups are o-tolyl, p-tolyl, 2,4-dimethylphenyl, 3,5-diisopropylphenyl, 4-t-butylphenyl, etc.

Representative halo-, alkoxy- and alkylthio-substituted $R^2$ groups include haloalkyl groups such as fluoromethyl, chloromethyl, dichloromethyl, trichloromethyl, tetrachloroethyl, 3-chloropropyl, 4-bromobutyl, 10-chlorodecyl, 14-bromotetradecyl, etc.; haloalkenyl such as trichlorovinyl, 2,2-difluorovinyl, 2-bromo-9-decenyl, etc.; haloaryl groups such as 4-chlorophenyl, 2,4-difluorophenyl, 3,5-dibromophenyl, 4-chlorobenzyl, 2-chloro-4-methylphenyl, etc.; alkoxyalkyl groups such as methoxymethyl, ethoxymethyl, 2-ethoxyethyl, 4-butoxybutyl, etc.; alkoxyalkenyl such as 4-methoxy-2-butenyl, 5-ethoxy-3-pentenyl, etc.; alkoxyaryl such as 4-methoxyphenyl, 2-methoxy-4-methylphenyl, 3-propoxyphenyl, 2-(2 - methoxyphenyl)ethyl, etc.; alkylthioalkyl such as methylthiomethyl, ethylthiomethyl, 2-ethylthioethyl, 5-pentylthiopentyl, etc.; alkylthioalkenyl such as 4-methylthio-2-butenyl, 4-ethylthio-3-hexenyl, etc.; alkylthioaryl such as 4-methylthiophenyl, 2-ethylthiobenzyl, 3-methyl - 4 - methylthiophenyl, 4-(2-methylthiophenyl)butyl, etc.

Preferred $R^2$ groups have up to 12 carbon atoms. Most preferred $R^2$ groups are alkyl of 1 to 12 carbon atoms and alkoxyalkyl of 2 to 12 carbon atoms.

The compounds of formula (I) may be prepared by acylating an O,O - dihydrocarbylphosphoroamidothioate with an appropriate acylating agent, e.g., an acid halide (VI) or acid anhydride (VII), as depicted in the following equation (2)

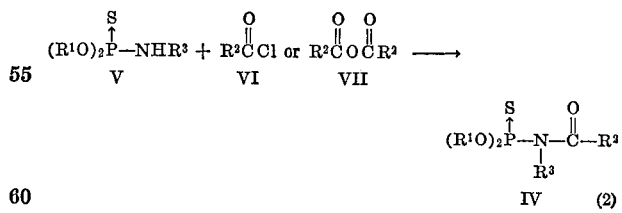

wherein $R^1$, $R^2$ and $R^3$ have the same significance as previously defined.

The acylation reaction (2) is usually carried out at about 0–60° C. in the presence of solvent such as methylene dichloride, chloroform, tetrahydrofuran and benzene. Pressure is not critical in this reaction. For convenience, atmospheric or autogenous pressure may be used. Under normal conditions, stoichiometric proportions or a slight excess of the acylating agent (VI or VII) will be used. The acylation reaction will usually take 2 to 24 hours to reach completion. The product (IV) may be purified by conventional techniques such as extraction, crystallization, chromatography, etc.

The O,O-dihydrocarbylphosphoroamidothioate compounds (V) used to prepare the N-acylphosphoroamidothioate compound (IV) may be prepared by the following reactions:

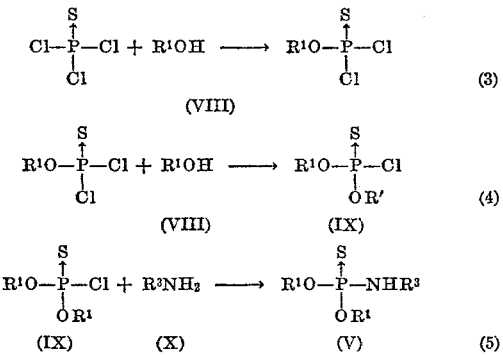

wherein $R^1$ and $R^3$ have the same significance as previously defined.

The first two reactions (equations 3–4) of the synthesis involves the addition of 2 mols of the alcohol (VIII) to 1 mol of phosphorous thiochloride ($PSCl_3$) (if both $R^1$ are the same, a single reaction can be carried out). These reactions are preferably carried out in the presence of a weak base, such as the organic amines, for example pyridine, dimethylaniline, triethylamine, etc. The base is preferably present in an amount at least equal to the mols of alcohol. An inert organic solvent, such as diethyl ether, tetrahydrofuran, dioxane, dichloromethane, etc. may be present. The reaction temperatures are generally in the range of 0 to 15° C., preferably 0 to 5° C. The reaction time necessary to complete the addition of the alcohol (VIII) to the phosphorous thiochloride will range from about 1 to 10 hours. The O,O-dihydrocarbylphosphorochloridothioate product (IX) can be purified by distillation, if desired.

The third reaction (equation 5) of the synthesis is carried out by reacting excess (e.g. 2 molar equivalents) of gaseous ammonia or the amine (X) with the O,O-dihydrocarbylphosphorochloridothioate (IX). The reaction is preferably carried out in an inert organic solvent, such as benzene, toluene, xylene and the like, at temperatures in the range of 10–75° C. Completion of the reaction is indicated by cessation of ammonium chloride or amine hydrochloride precipitation. Following the reaction, the product (V) can be isolated by conventional methods such as filtration, extraction, distillation, chromatography, etc.

The Mercaptide Reactant

The alkali metal and ammonium mercaptide reactant employed in the process of the invention is represented by the following formula (XI)

$$R^4SM \qquad (XI)$$

wherein $R^4$ is alkyl of 1 to 6 carbon atoms, preferably n-alkyl, and M is an alkali metal, e.g., lithium, sodium, potassium, rubidium or cesium, or ammonium.

Preferred mercaptides of formula (XI) are lithium, sodium, potassium and ammonium alkyl mercaptides. Most preferred mercaptides are sodium n-alkyl mercaptides.

Examples of mercaptides of formula (XI) are ammonium methyl mercaptide, lithium methyl mercaptide, sodium methyl mercaptide, potassium methyl mercaptide, ammonium ethyl mercaptide, sodium ethyl mercaptide, rubidium ethyl mercaptide, ammonium propyl mercaptide, sodium propyl mercaptide, potassium propyl mercaptide, cesium propyl mercaptide, ammonium isopropyl mercaptide, sodium isopropyl mercaptide, ammonium butyl mercaptide, sodium butyl mercaptide, ammonium pentyl mercaptide, potassium pentyl mercaptide, ammonium hexyl mercaptide, sodium hexyl mercaptide, etc.

The alkali metal or ammonium mercaptides are prepared from the corresponding alkyl mercaptan by conventional procedures. For example, the mercaptides may be prepared by the reaction of an alkyl mercaptan with an alkali metal hydroxide or ammonium hydroxide, optionally followed by the removal of water. Alternatively, the mercaptides may be prepared by the reaction of an alkyl mercaptan with (1) an alkali metal alkoxide of 1 to 6 carbon atoms, e.g., sodium methoxide, potassium t-butoxide, etc.; (2) an alkali metal amide, e.g., potassium amide; (3) an alkali metal hydride or aluminum hydride, e.g., sodium hydride or lithium aluminum hydride; or (4) an alkali metal alkyl of 1 to 6 carbon atoms, e.g., butyl lithium, in an anhydrous solvent.

The Reaction Conditions

The process of the invention may be depicted by the following equation (6)

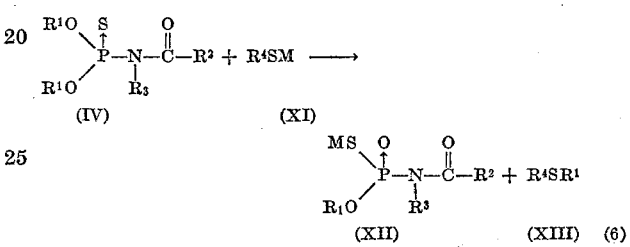

wherein $R^1$, $R^2$, $R^3$, $R^4$ and M have the same significance as defined above.

The metalation reaction depicted in equation (6) is conducted in the liquid phase in the presence of an inert organic solvent. Suitable organic solvents include oxygenated hydrocarbons such as alkanols of 1 to 6 carbon atoms, e.g., methanol, ethanol, isopropanol, butanol, hexanol, etc.; dialkyl ketones of up to 8 carbon atoms, e.g., acetone, methyl ethyl ketone, etc.; acyclic alkyl ethers, e.g., dimethyl ether, dibutyl ether, dimethoxyethane, diethylene glycol dimethyl ether, etc.; and cycloalkyl ethers, e.g., dioxane, tetrahydrofuran and tetrahydropyran. Other suitable organic solvents include nitriles such as acetonitrile and propionitrile; dialkylamides such as dimethylformamide; dialkylsulfoxides such as dimethylsulfoxide; and alkyl and alkenyl mercaptans such as ethyl mercaptan, n-butyl mercaptan, 2-butenyl mercaptan, etc. Still other suitable solvents comprise water or water containing a portion of a polar organic co-solvent. Suitable mixtures of water and a polar organic co-solvent vary by volume, from about 20% co-solvent to 80% co-solvent and from about 20% water to 80% water. Solvents are used in quantities sufficient to form a slurry of the reactants or a substantially liquid phase solution. Generally, the amount of solvent varies from about 1 mol to 100 mols per mol of the N-acylphosphoroamidothioate reactant.

The temperature of the reaction may vary from 0–150° C., preferably from 10–100° C. and more preferably from 20–60° C. Pressure is not critical, so long as the reaction mixture is maintained substantially in a non-gaseous phase. Typical pressures vary from 1 to 10 atmospheres. The time of reaction varies with the temperature. In general, the reaction is complete within 10 hours, more usually 5 hours or less.

The precise method of establishing mercaptide and O,O-dihydrocarbyl - N - acylphosphoroamidothioate contact is not critical. In one modification, the mercaptide, O,O-dihydrocarbyl-N-acylphosphoroamidothioate and solvent are charged to an autoclave or similar reactor, and the reaction mixture is maintained with agitation at reaction temperature and pressure for the desired reaction period. A preferred modification of the reaction involves the "in situ" formation of a mercaptide with concurrent metalation of the O,O-dialkyl - N - acylphosphoroamidothioate. This modification takes place in a single reactor charged with the solvent, a mercaptan, an alkali metal or ammonium base, and an O,O-dialkyl-N-acylphosphoroamidothioate. This reaction may be depicted for a hydroxide or alkoxide base as follows:

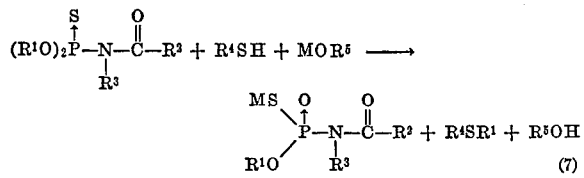

wherein R¹, R², R³, R⁴ and M have the same significance as previously defined and R⁵ is hydrogen or alkyl of 1 to 6 carbon atoms (e.g., MOR⁵ is an alkali metal hydroxide or alkoxide). The reaction conditions are essentially the same as previously described for the reaction with a preformed mercaptide.

The amount of reactants employed in the process of the invention are as defined by the stoichiometry depicted in equation (6) and (7). That is, the molar ratio of mercaptide (or mercaptan and an alkali metal or ammonium base) to the phosphoroamidothioate reactant is substantially equimolar. However, an excess of any reactant is suitably employed. For example, as indicated above, a mercaptan may be employed as a reaction solvent. Generally, the molar ratio of the mercaptide to the phosphoroamidothioate varies from 1:2 to 2:1.

The S-alkali metal or S-ammonium salt of the N-acyl-O-hydrocarbylphosphoroamidothioate is sometimes soluble in the reaction medium and may be used for further reactions without separation. However, the product usually precipitates upon standing as a solid crystalline material which may be collected by filtration, centrifugation or decantation. The solid product can be purified by washing with a liquid or by crystallization from an appropriate solvent such as acetone, ethanol, etc.

The Alkali Metal and Ammonium Phosphoroamidothioate Salts

The S-alkali metal and S-ammonium salts produced by the process of the invention are represented by the formula (XII)

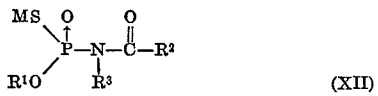

wherein R¹, R², R³ and M have the same significance as previously defined.

Illustrative S-alkali metal and S-ammonium salts of formula (XII) are

S-ammonium-N-acetyl-O-methylphosphoroamidothioate,
S-ammonium-N-crotonoyl-O-ethylphosphoroamidothioate,
S-ammonium-N-trichloroacetyl-N-methyl-O-propylphosphoroamidothioate,
S-lithium-N-methoxyacetyl-O-methylphosphoroamidothioate,
S-lithium-N-4-chlorocrotonyl-O-butylphosphoroamidothioate,
S-lithium-N-4-alkoxybenzoyl-O-methylphosphoroamidothioate,
S-lithium-N-3-phenylpropionyl-O-methylphosphoroamidothioate,
S-lithium-N-O-tolylacetyl-O-methylphosphoroamidothioate,
S-lithium-N-4-chlorophenylacetyl-O-methylphosphoroamidothioate,
S-sodium-N-acetyl-N-isopropyl-O-methylphosphoroamidothioate,
S-sodium-N-methoxyacetyl-O-methylphosphoroamidothioate,
S-sodium-N-propionyl-O-methylphosphoroamidothioate,
S-sodium-N-methylthioacetyl-O-methylphosphoroamidothioate,
S-sodium-N-butyryl-O-methylphosphoroamidothioate,
S-sodium-N-octanoyl-O-methylphosphoroamidothioate,
S-sodium-N-decanoyl-O-methylphosphoroamidothioate,
S-sodium-N-dichloroacetyl-O-methylphosphoroamidothioate,
S-potassium-N-acetyl-O-ethylphosphoroamidothioate,
S-sodium-N-ethoxyacetyl-O-ethylphosphoroamidothioate,
S-potassium-N-fluoroacetyl-N-isopropyl-O-hexylphosphoroamidothioate,
S-potassium-N-ethylthioacetyl-O-methylphosphoroamidothioate,
S-potassium-N-propionyl-O-methylphosphoroamidothioate,
S-potassium-N-4-methylbenzoyl-O-methylphosphoroamidothioate,
S-rubidium-N-acetyl-O-methylphosphoroamidothioate,
S-rubidium-N-methoxyacetyl-O-methylphosphoroamidothioate,
S-cesium-N-acetyl-O-methylphosphoroamidothioate,
S-cesium-N-4-methoxybutyryl-O-methylphosphoroamidothioate, etc.

The preferred compounds of formula (VI) are those wherein M is sodium, potassium or ammonium and R is alkyl or alkoxyalkyl. The most preferred compounds are N-alkanoylphosphoroamidothioates wherein M is sodium, R² is alkyl of 1 to 11 carbon atoms, and both R¹ are the same.

The alkali metal and ammonium salts prepared by the process of this invention are useful intermediates for the preparation of O-hydrocarbyl-S-alkyl- or alkenyl-N-acylphosphoramidothioates. They are especially useful in the preparation of compounds having different groups attached to the sulfur and oxygen atoms. These derivatives are prepared by reacting the salt with an alkylating agent. Suitable alkylating agents include the alkyl and alkenyl halides, such as methyl iodide, ethyl bromide, allyl chloride, hexyl bromide, crotyl chloride, benzyl chloride, propargyl bromide, isopropyl iodide, etc.; the dialkyl and dialkenyl sulfates, such as dimethyl sulfate, diethyl sulfate, diallylsulfate, etc.; and the alkyl and alkenyl aryl- or alkanesulfonates, such as methyl p-toluenesulfonate, ethyl 2,4-xylenesulfonate, allyl p-toluenesulfonate, methyl methanesulfonate, allyl ethanesulfonate, etc. The preferred alkylating agents are the dialkyl sulfates, especially the dimethyl sulfate.

Alkylation is effected by mixing the S-salts of the N-acylated phosphoroamidothioates and the alkylating agent in an inert solvent or in excess of liquid alkylating agent at temperatures in the range of 0–80° C., preferably 25–60° C. Suitable solvents are the halogenated hydrocarbons such as dichloromethane, chloroform, tetrachloroethane, or acetonitrile, acetone, methanol, etc.

The following examples describe methods which may be used to prepare S-salts of N-acylphosphoroamidothioates.

EXAMPLE 1

Preparation of S-sodium-O-methyl-N-acetylphosphoroamidothioate

1. Sodium, 5.1 g. (0.22 mol) was added slowly in small pieces to 70 ml. of methanol. Then 19.8 g. (0.22 mol) of n-butyl mercaptan was added to this stirred sodium methoxide-containing solution. When all of the butyl mercaptan had been added, the solvent was removed, benzene and acetone were then added, and the solution was again evaporated to dryness. The resulting sodium n-butyl mercaptide was recovered as a powder.

2. The mercaptide prepared above was slurried in 90 ml. of acetone. This slurry was cooled in an ice bath, and then 38.5 g. (0.20 mol) of O,O-dimethyl-N-acetylphosphoroamidothioate dissolved in 90 ml. of acetone was added slowly. The resulting clear solution was stirred at 0° C. for two hours. Then the solution was allowed to stand at 25° C. for 16 hours. A solid precipitate was removed by filtration and was dried to give 9.9 g. The filtrate from the above filtration was refluxed for six hours. After cooling to and standing at 25° C. for 16 hours, a second crop of precipitated crystals, 16.6 g., was recovered. The total yield of product was 69%. Analysis calculated for $C_3H_7NO_3PSNa$: N, 7.3%; P, 16.2%; S, 16.1%. Found: N, 7.0%; P, 15.1%; S, 16.4%. The NMR was consistent with the assigned structure. An infrared spectra showed characteristic absorption peaks at 3300, 1650, 1160, and 1040 cm.$^{-1}$.

EXAMPLE 2

Preparation of S-sodium-O-methyl-N-propionylphosphoroamidothioate

O,O-dimethyl-N-propionylphosphoramidothioate, 55 g. (0.28 mol), was dissolved in 180 ml. of methanol. To this solution there was added 24 g. (0.30 mol) of 50% aqueous sodium hydroxide. The resulting solution was stirred for 10 minutes, then 27 g. (0.30 mol) of n-butyl mercaptan was added. This mixture was refluxed for five hours, and then held at 25° C. for 16 hours. The precipitated solid was removed by filtration, washed with acetone, and then dried under vacuum. The resulting solids, 37 g., had an NMR spectra consistent with the assigned structure. Analysis, calculated for $C_4H_9NO_3PSNa$:

S, 15.6%; N, 6.8%; C, 23.4%; H, 4.4%. Found: S, 15.5%; N, 6.0%; C, 23.0%; H, 5.3%. The infrared spectra had characteristic absorption peaks at 3410, 3220, 1660, 1180, and 1040 cm.$^{-1}$.

EXAMPLE 3

Preparation of O-methyl-S-methyl-N-acetylphosphoroamidothioate

S-sodium-O-methyl-N-acetylphosphoramidothioate, 1.25 g. (0.0066 mole), was added to 10 ml. of acetonitrile in a 35-ml. flask. To this was added 0.68 g. (0.0054 mole) of methyl methanesulfonate and then the reactants were heated to 90° C. for 18 hours. After cooling, the reaction mixture was filtered, and the filtrate was evaporated to give 1.02 g. of O-methyl-S-methyl-N-acetylphosphoramidothioate (a commercial product marketed under the trademark Orthene® Insecticide).

EXAMPLE 4

Preparation of S-sodium-O-methyl-N-dodecanoylphosphoroamidothioate and O,S-dimethyl-N-dodecanoylphosphoroamidothioate A 30 g. sample of O,O-dimethylphosphoroamidothioate and 41 g. of n-dodecanoyl chloride were dissolved in 120 ml. methylene dichloride and refluxed for 2 hours. After treatment with water to remove acidic by-products, the solution was dried over magnesium sulfate and stripped to give 60.4 g. of O,O-dimethyl-N-dodecanoyl phosphoroamidothioate.

To a solution of 4.7 g. (0.062 mol) n-propyl mercaptan in 80 ml. methanol was added 5 g. (0.062 mol) of 50% aqueous sodium hydroxide solution. The reaction mixture was stirred for 10 minutes (slightly exothermic). To the reaction mixture was then added 20 g. (0.062 mol) O,O-dimethyl-N-dodecanoylphosphoroamidothioate and 20 ml. of methanol. The resulting mixture was refluxed for 3 hours and left standing overnight (~17 hours) at room temperature (~25° C.). The S-sodium-O-methyl-N-dodecanoylphosphoroamidothioate product was used without isolation for the preparation of S-methyl-O-methyl-N-dodecanoylphosphoroamidothioate as described below.

To the above sodium salt-containing mixture was added with stirring 15.6 g. (0.124 mol) of dimethyl sulfate. The resulting reaction mixture was stirred at about 25° C. for 1.5 hours and then diluted with 50 ml. water. Most of the methanol and water were removed by evaporation under reduced pressure and the residue was extracted with methylene dichloride. The methylene dichloride extract was washed with water, dried over magnesium sulfate and evaporated under reduced pressure to give a viscous oil which solidified on standing. The solid was recrystallized from hexane to give the product (61% yield), m.p. 49–50° C. Elemental analysis on the product showed:

|  | Calcd. | Found |
|---|---|---|
| Percent P | 9.58 | 9.57 |
| Percent S | 9.91 | 9.97 |

The product is a highly active insecticide as disclosed in U.S. Ser. No. 13,846, filed Feb. 24, 1970, now U.S. 3,716,600.

EXAMPLE 5

Preparation of S-sodium-O-allyl-N-acetylphosphoroamidothioate and S-methyl-O-allyl-N-acetylphosphoroamidothioate A 68 g. (1.1 mol) sample of allyl alcohol was added dropwise to 84 g. (0.5 mol) phosphorous thiochloride ($PSCl_3$) at 0–10° C. The resulting reaction mixture was cooled in a Dry-Ice/acetone bath while 80 g. (1 mol) of a 50% sodium hydroxide solution was added. After the addition was completed, the reaction mixture was stirred at about 25° C. for 1½ hours, diluted with 200 ml. water and 50 ml. chloroform. The organic phase was separated, dried over magnesium sulfate, filtered and evaporated under reduced pressure. The residue was distilled to give 31.3 g. of O,O-diallylphosphorochloridothioate, b.p. 72–74° C. (0.15 mm. Hg).

The above O,O-diallylphosphorochloridothioate (30 g.) and 100 ml. benzene were then charged to a flask and ammonia (10 g.) was slowly added. A heavy precipitate was formed in an exothermic reaction. The reaction was evaporated to give a cloudy white liquid. The liquid was diluted with 50 ml. methylene chloride and refluxed with 10 g. of 28% ammonium hydroxide for ½ hour. The organic layer was washed with water, dried over magnesium sulfate, filtered and evaporated to give 20 g. of O,O-diallylphosphoroamidothioate.

A 10 g. (0.0518 mole) sample of the above O,O-diallylphosphoroamidothioate, 6 g. (0.059 mole) acetic anhydride, 40 ml. methylene chloride and 1 ml. phosphoric acid was refluxed for 3 hours. The reaction mixture was diluted with 50 ml. water and 100 ml. aqueous saturated ammonium chloride solution. The aqueous solution was extracted with methylene chloride. The methylene chloride extracts were washed with aqueous ammonium chloride solution, dried over magnesium sulfate and evaporated to give 10.4 g. of O,O-diallyl-N-acetylphosphoroamidothioate.

A mixture of 10 g. (0.0425 mole) of the above O,O-diallyl-N-acetylphosphoroamidothioate, 4.3 g. (0.0425 mole) sodium n-butyl mercaptide and 40 ml. methanol was refluxed for 4 hours and then evaporated under reduced pressure to give the crude S-sodium-O-allyl-N-acetylphosphoroamidothioate salt. The salt, 6 g. methyl methanesulfonate and 40 ml. acetonitrile was then refluxed for 25 hours. A heavy precipitate formed. The reaction mixture was filtered and the filtrate was evaporated under reduced pressure to give 9 g. of a yellow liquid residue. The residue was chromatographed on silica (hexane/methylene chloride/acetone eluants) to give the S-methyl-O-allyl-N-acetylphosphoroamidothioate product as an oil. Elemental analysis for $C_6H_{12}NO_3PS$ showed:

|  | Calcd. | Found |
|---|---|---|
| Percent wt. P | 14.8 | 14.62 |
| Percent wt. S | 15.4 | 15.8 |

EXAMPLE 6

Preparation of S-sodium-O-methyl-N-hexanoylphosphoroamidothioate

O,O-dimethyl-N-hexanoylphosphoroamidothioate, 69 g. (0.28 mol), was dissolved in 100 ml. methanol. To this solution was added 23 g. (0.29 mol) of 50% aqueous sodium hydroxide. The resulting solution was stirred for 10 minutes, then 26.3 g. (0.29 mol) of n-propyl mercaptan was added. This mixture was refluxed for 4 hours, and then held at 25° C. for about 17 hours. The precipitated solid was removed by filtration, washed with methylene dichloride and then dried under vacuum to give 38 g. of product, m.p. 105–108° C. Elemental analysis showed:

|           | Calcd. | Found |
|-----------|--------|-------|
| Percent S | 17.2   | 16.5  |
| Percent P | 16.6   | 16.2  |

EXAMPLE 7

Preparation of S-sodium-O-methyl-N-isovaleroylphosphoroamidothioate

O,O-dimethyl-N-isovaleroylphosphoroamidothioate, 78 g. (0.346 mol), was dissolved in 100 ml. methanol. To this solution was added 28 g. (0.346 mol) of a 50% aqueous sodium hydroxide solution. The resulting solution was stirred for 10 minutes, then 31.2 g. (0.346 mol) of n-butyl mercaptan was added. This mixture was refluxed for 3.5 hours, and then held at 25° C. for about 17 hours. The precipitated solid was removed by filtration, washed with diethyl ether and then dried under vacuum to give 37 g, of product, m.p. 115–118° C. Elemental analysis showed:

|           | Calcd. | Found |
|-----------|--------|-------|
| Percent S | 13.7   | 13.5  |
| Percent P | 13.4   | 12.3  |

EXAMPLE 8

A solution of 5.5 g (0.03 mol) O,O-dimethyl-N-acetylphosphoroamidothioate, 2.4 g. (0.03 mol) of 50% aqueous sodium hydroxide solution and 15 ml. of methanol was allowed to stand at about 25° C. for 26 hours. The solution was evaporated under reduced pressure to give a viscous oil. When the oil was diluted with acetone, no sodium salt precipitate was obtained. The acetone was removed by evaporation under reduced pressure and the resulting oil was diluted with water and acidified with hydrochloric acid. The aqueous mixture was extracted with methylene dichloride. The methylene dichloride extracts were washed with water, dried over magnesium sulfate and evaporated under reduced pressure to give a yellow oil. Infrared and nuclear magnetic resonance spectroscopic analysis showed the oil to be O,O-dimethyl-N-acethylphosphoroamidothioate recovered without change.

The procedure employed above is essentially identical to that disclosed in German application No. F 43,328 (priority application for U.S. 3,676,555) for the preparation of S-sodium-O-ethylphosphoroamidothioate.

EXAMPLE 9

A solution of 11 g. (0.06 mol) O,O-dimethyl-N-acetylphosphoroamidothioate, 4.8 g. (0.06 mol) of 50% aqueous sodium hydroxide solution and 30 ml. methanol was refluxed for 2 hours. The solution was evaporated under reduced pressure to give a semi-solid residue. The residue was diluted with acetone and filtered to give 1.6 g. of a solid. Analysis of the solid for S-sodium-O-methyl-N-acetylphosphoroamidothioate ($C_3H_7NO_3PSNa$) showed:

|           | Calcd. | Found |
|-----------|--------|-------|
| Percent N | 7.33   | Trace |
| Percent P | 16.20  | Trace |
| Percent S | 16.78  | 5.39  |

The filtrate was evaporated under reduced pressure to give a yellow oil. The oil was diluted with water and acidified with hydrochloric acid. The aqueous mixture was extracted with methylene dichloride. The methylene dichloride extracts were washed with water, dried over magnesium sulfate and evaporated under reduced pressure to give a yellow oil. The infrared spectrum of the oil was nearly identical to the infrared spectrum of the O,O-dimethyl-N-acetylphosphoroamidothioate starting material.

I claim:

1. A process for preparing S-alkali metal and S-ammonium salts of N-acylphosphoroamidothioates which comprises reacting an N-acylphosphoroamidothioate of the formula

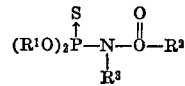

wherein $R^1$ is alkyl or alkenyl of up to 6 carbon atoms, $R^2$ is hydrogen, alkyl or alkenyl of up to 18 carbon atoms, and $R^3$ is hydrogen or alkyl of 1 to 6 carbon atoms, with an alkali metal or ammonium alkyl mercaptide in liquid phase at a temperature of from about 0 to 150° C.

2. The process of Claim 1 wherein $R^2$ is alkyl of up to 18 carbon atoms.

3. The process of Claim 1 wherein the mercaptide is a sodium n-alkyl mercaptide of 1 to 6 carbon atoms.

4. The process of Claim 1 wherein the mercaptide is produced *in situ* from an alkyl mercaptan and an alkali metal hydroxide or alkoxide.

5. The process of Claim 1 wherein $R^1$ is alkyl.

6. Compound of the formula

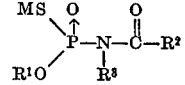

wherein $R^1$ is alkyl or alkenyl of up to 6 carbon atoms, $R^2$ is hydrogen, alkyl or alkenyl of up to 18 carbon atoms, $R^3$ is hydrogen, alkyl of 1 to 6 carbon atoms, and M is lithium, sodium or potassium.

7. Compound of Claim 6 wherein $R^2$ is alkyl of 1 to 12 carbon atoms.

8. Compound of Claim 6 wherein M is sodium or potassium.

9. S-sodium-O-methyl-N-acetylphosphoroamidothiate.

10. Compound of Claim 6 being S-sodium-O-allyl-N-acetylphosphoroamidothioate.

11. Compound of Claim 6 being S-sodium-O-methyl-N-dodecanoylphosphoroamidothioate.

References Cited

UNITED STATES PATENTS 3,716,600   2/1973   Magee _____ 260—402.5

ELBERT L. ROBERTS, Primary Examiner

U.S. Cl. X.R.

260—934